June 22, 1926.

W. TAPLEY

GRADIENT METER

Filed Oct. 3, 1924

1,589,767

Inventor:

Geo. Tapley

Patented June 22, 1926.

UNITED STATES PATENT OFFICE.

1,589,767

WILLIAM TAPLEY, OF REDBRIDGE, ENGLAND.

GRADIENT METER.

Application filed October 3, 1924, Serial No. 741,491, and in Great Britain September 18, 1924.

The present invention relates to gradient meters of the type in which the indications are controlled by a magnetic pendulum, the vibrations of such pendulum being damped by its enclosure in a sealed box of damping fluid. Such an instrument was patented by me in Great Britain under No. 21517 of 1910.

In this type of gradient meter an armature is provided outside the sealed box, which by means of attraction by the enclosed magnetic pendulum, is used to locate the position of the pendulum.

Mechanical connection is made between the armature and either a moving scale, or pointer, by which the indications are given. In the former case, the moving scale takes the form of a light cylinder which is arranged to embrace and revolve round the damping box, the spindle upon which the cylindrical scale is mounted being provided with a pinion which is actuated by a toothed quadrant moving with the armature. In this form of instrument the exterior of the cylindrical scale is suitably divided, the divisions being exhibited through a window in the outer case.

The present invention relates more particularly to the type of meter indicating by means of such revolving scale, and it consists of an improved arrangement whereby the scale may be more accurately and conveniently set to the level mark. The invention further relates to improvements which provide a more effective damping of the moving parts than has been hitherto attainable.

In order that the said invention may be clearly understood I append hereto one sheet of drawings forming a portion of this specification, in which, Figure 1 is a sectional side elevation of the complete instrument.

Figure 1:
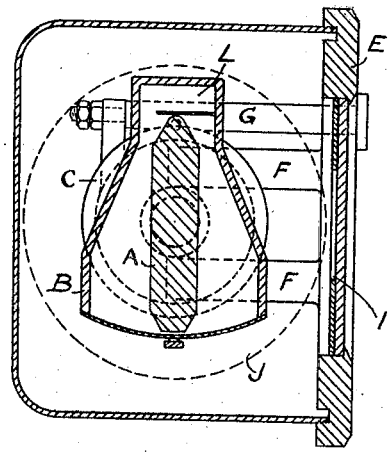

In carrying out my invention, instead of mounting the damping box on a fixed plate as heretofore, I provide a supporting bearing on one side of the said box arranged so that the whole box may be revolved inside and in relation to its outer containing case. Consequently the damping box may be set in a vertical position irrespective of the angle at which the outer case and faceplate may be fixed.

The spindle of the cylindrical scale is mounted in bearings attached to the other side of the damping box, this spindle being in line with the bearing on which the box revolves.

In order to conveniently bring the damping box to a vertical position I provide mechanism such as a worm and worm wheel, gears, cams, levers, or the like adapted to revolve the damping box to the required position from the outside of the case.

Referring to the drawing, an arrangement making use of a worm and worm wheel is shown.

Figure 2:
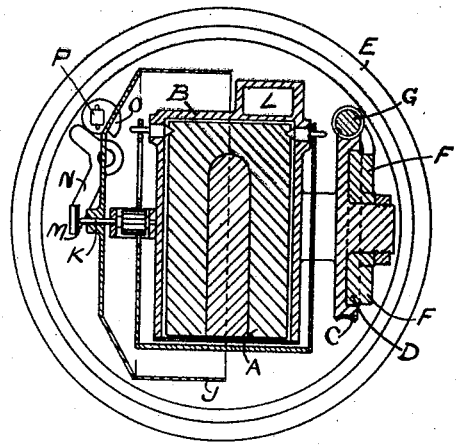
Figure 2 is a sectional back elevation.

The magnetic pendulum is shown in Figs. 1 and 2 at A. The damping box B carries the worm wheel C, which latter is mounted on the circular plate D on which it can be revolved. The plate D is fixed to the faceplate E of the instrument by the arms F.

The spindle G, projecting through the faceplate and arranged so that it can conveniently be turned from the front, carries a worm H meshing with the worm wheel C.

The instrument is shown with its faceplate vertical, but it may also be at any angle to the vertical, the damping box being set to the vertical by means of the worm and worm wheel.

The window through which the indications are seen is at I. The cylindrical scale shown at J is mounted on its spindle K in such a position that when the damping box is vertical the "level" mark appears through the window when the faceplate is approximately at the inclination of the instrument board for which it is intended. A final, and exact adjustment, is made after fixing the instrument, by turning the spindle G until the mark is exactly opposite the indicating arrow when the car is on level ground.

Thus a gradient meter is provided which can have its face at any desired angle, and which also can be accurately adjusted to read level after it has been fixed. Such adjustment also allows compensation to be easily made for variation in inclination such as may be caused by variation of load or tyre pressure.

The further object of my invention provides for a more perfect damping of the moving parts than has hitherto been attainable, and is carried out as follows:—

In order that the expansion of the fluid in the damping box B, may not burst the box it is usual to completely fill and seal the box while it is at the highest temperature it is likely to attain under climatic conditions. At normal, or low temperature there is consequently a void space at the top of the box, and this space being easily transferred from one side of the pendulum to the other prevents the immediate damping action that would take place if the box were completely full of fluid.

My present invention provides a chamber for the expansion of the fluid arranged above but in connection with the damping box. By this means I keep the damping box completely full of fluid irrespective of change of temperature, and by restricting the passage above the pendulum I ensure that the full damping action takes place immediately.

The arrangement described is shown in Figs. 1 and 2 where the expansion chamber is at "L", the passage above the pendulum being restricted by the top of the damping box which may also form the bottom of the expansion chamber as shown.

Although the damping action of the main magnetic pendulum is sufficient to eliminate any violent oscillation of the moving scale in response to road shocks and vibration, it is necessary to provide a slight amount of additional frictional damping of the scale in order to give quite steady indications.

The amount of frictional damping it is necessary to add varies with the type of vehicle on which the instrument is used, being, for instance, more on a light car of short wheel base, than on a heavy car of long wheel base. My invention provides for a frictional damping which is easily adjustable to suit the particular vehicle on which an instrument is mounted.

Figure 3:
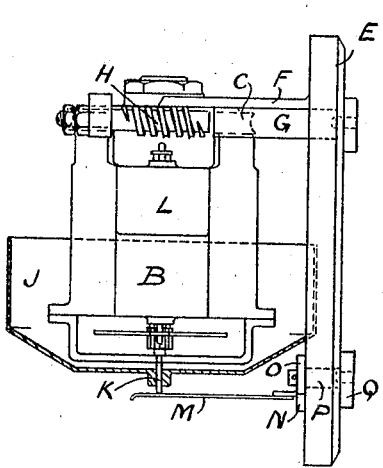
Figure 3 is a plan, the outer case being removed, and the revolving scale shown in section.
Figure 4:
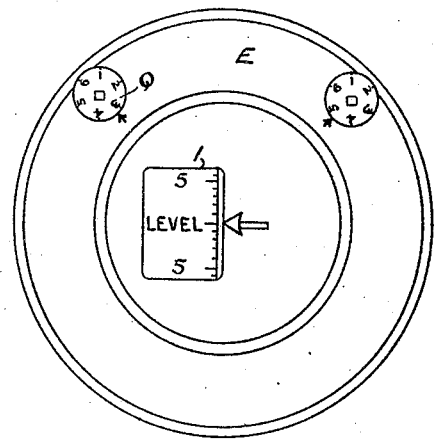
Figure 4 is a front elevation of the face of the instrument.

The means I provide are shown in Figs. 2, and 3, and consist of a light spring adapted to press on the spindle on which the cylindrical scale is mounted.

This spring which is shown at M, it attached to a lever N, pivoted on the back of the faceplate and is adapted to be rocked by the cam O so that the pressure exerted on the spindle is varied.

The cam O is turned from the front of the instrument my means of the pin P, the head Q of which may be graduated to show the amount of tension exerted. Thus the frictional damping can be varied at will, and the best results can be obtained on any particular vehicle, or under any particular conditions.

I do not confine myself to the particular method described of varying the pressure, but may provide a screw lever, or any other suitable means of adjusting the pressure of spring. The spring may also be arranged to press on the side of the spindle instead of on the end as shown.

Having now particularly described and ascertained the nature of my said invention and in what manner the same is to be performed, I declare that what I claim is:—

1. A gradient meter including a case, a damping box rotatably adjustable within said case, manually regulated means extending into the case for adjusting said box, a magnetic pendulum within the box, an armature movable in the case externally of the box and controlled by said pendulum, a damping fluid in the box around the pendulum, a movable reading scale, operative connections between the armature and the scale, and manually regulated means extending into the case for adjustable frictional engagement with and damping of the said scale.

2. A gradient meter including a case, a damping box rotatably adjustable within said case, manually regulated means extending into the case for adjusting said box, a magnetic pendulum within the box, an armature movable in the case externally of the box and controlled by said pendulum, a damping fluid in the box around the pendulum, a movable reading scale, operative connections between the armature and the scale including a shaft with which the scale rotates, a spring, an adjusting stem extending into the case from the exterior thereof, and a cam member on the inner end of said stem engaging and controlling said lever to regulate the effective damping pressure of the spring against the scale shaft.

3. In a gradient meter including a case, a damping box adjustable in the case, a reading scale having a spindle, a magnetic pendulum in the box, a damping fluid in the box around the pendulum, an armature within the case externally of the box and operatively connected to the scale spindle, and mechanical means for damping the reading scale including a spring member frictionally engaging the spindle thereof, and means for controlling the effective pressure of said spring from a point outside the case.

4. A gradient meter of the type employing a magnet controlled armature, a reading scale, and a shaft upon which said scale is secured, operatively connected with the armature for actuation by the latter, a damping spring frictionally engaging the shaft, and means including a lever to which said spring is secured, and an adjusting cam engaging and controlling the lever for regulating the effective pressure of said damping spring.

WILLIAM TAPLEY.